United States Patent [19]

Barton

[11] 4,180,814
[45] Dec. 25, 1979

[54] MULTIPLE BEAM RECEIVING ARRAY SIGNAL PROCESSOR

[75] Inventor: Paul Barton, Bishops Stortford, England

[73] Assignee: International Standard Electric Corporation, New York, N.Y.

[21] Appl. No.: 885,607

[22] Filed: Mar. 13, 1978

[51] Int. Cl.² ............................ G01S 3/14; G01S 9/02
[52] U.S. Cl. ............................... 343/5 DP; 343/5 FT; 343/100 CL
[58] Field of Search .......... 343/5 DP, 100 CL, 5 NQ, 343/5 FT

[56] References Cited

U.S. PATENT DOCUMENTS

| | | | |
|---|---|---|---|
| 3,483,561 | 12/1969 | Procopio, Jr. | 343/100 CL X |
| 3,787,849 | 1/1974 | Sletten et al. | 343/5 DP X |
| 3,987,285 | 10/1976 | Perry | 343/5 DP X |
| 4,045,795 | 8/1977 | Fletcher | 343/5 DP X |
| 4,075,630 | 2/1978 | Shapiro et al. | 343/5 DP |

Primary Examiner—Malcolm F. Hubler
Attorney, Agent, or Firm—William T. O'Neil

[57] ABSTRACT

An array (aperture) signal processor using surface acoustic wave delay lines for reordering of the received signals according to the prime number transform algorithm. The output of the processor is a radar response equivalent to forming a multiplicity of narrow beams essentially simultaneously. Reordering of the received signals is simply a matter of rearranging the hardwired connections to a first SAW delay line, and convolution of the reordered signals is achieved by phase weighting the taps in a second SAW delay line which forms part of a transversal filter.

5 Claims, 5 Drawing Figures

Fig. 2a.

PHASE WEIGHTS $\frac{2\pi}{11}P$    $P=$ | 2 | 4 | 8 | 5 | 10 | 9 | 7 | 3 | 6 | 1 | 2 | 4 | 8 | 5 | 10 | 9 | 7 | 3 | 6 | 1 |

INPUT DATA

| Position | | | | | | | | | | | | | | | | | | | | | | | | | | | | |
|---|---|---|---|---|---|---|---|---|---|---|---|---|---|---|---|---|---|---|---|---|---|---|---|---|---|---|---|
| 1ST. POSITION | 2 | 4 | 8 | 5 | 10 | 9 | 7 | 3 | 6 | 1 | | | | | | | | | | |
| 2ND. POSITION | | 2 | 4 | 8 | 5 | 10 | 9 | 7 | 3 | 6 | 1 | | | | | | | | | |
| 3RD. POSITION | | | 2 | 4 | 8 | 5 | 10 | 9 | 7 | 3 | 6 | 1 | | | | | | | | |
| 4TH. POSITION | | | | 2 | 4 | 8 | 5 | 10 | 9 | 7 | 3 | 6 | 1 | | | | | | | |
| 5TH. POSITION | | | | | 2 | 4 | 8 | 5 | 10 | 9 | 7 | 3 | 6 | 1 | | | | | | |
| 6TH. POSITION | | | | | | 2 | 4 | 8 | 5 | 10 | 9 | 7 | 3 | 6 | 1 | | | | | |
| 7TH. POSITION | | | | | | | 2 | 4 | 8 | 5 | 10 | 9 | 7 | 3 | 6 | 1 | | | | |
| 8TH. POSITION | | | | | | | | 2 | 4 | 8 | 5 | 10 | 9 | 7 | 3 | 6 | 1 | | | |
| 9TH. POSITION | | | | | | | | | 2 | 4 | 8 | 5 | 10 | 9 | 7 | 3 | 6 | 1 | | |
| 10TH. POSITION | | | | | | | | | | 2 | 4 | 8 | 5 | 10 | 9 | 7 | 3 | 6 | 1 | |

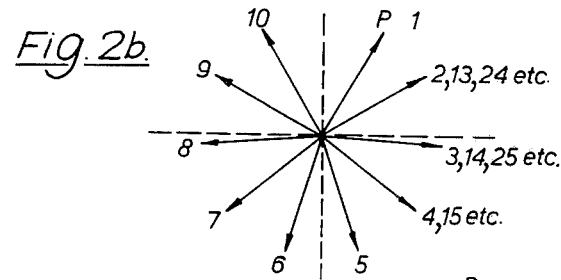

$e^{j\frac{2\pi P}{N}}$

| PHASE WEIGHTS | | | | DATA SAMPLES | | | | | | | |
|---|---|---|---|---|---|---|---|---|---|---|---|
| | 1 | 2 | 3 | 4 | 5 | 6 | 7 | 8 | 9 | 10 | |
| 1ST POSITION | 1 | 2 | 3 | 4 | 5 | 6 | 7 | 8 | 9 | 10 | 1ST. "BEAM" |
| 2ND. POSITION | 2 | 4 | 6 | 8 | 10 | 1 | 3 | 5 | 7 | 9 | |
| | ≡2 | 4 | 6 | 8 | 10 | 12 | 14 | 16 | 18 | 20 | 2ND. "BEAM" |
| 3RD. POSITION | 4 | 8 | 1 | 5 | 9 | 2 | 6 | 10 | 3 | 7 | |
| | ≡4 | 8 | 12 | 16 | 20 | 24 | 28 | 32 | 36 | 40 | 4TH. "BEAM" |
| 4TH. POSITION | 8 | 5 | 2 | 10 | 7 | 4 | 1 | 9 | 6 | 3 | |
| | ≡8 | 16 | 24 | 32 | 40 | 48 | 56 | 64 | 72 | 80 | 8TH. "BEAM" |
| 5TH. POSITION | 5 | 10 | 4 | 9 | 3 | 8 | 2 | 7 | 1 | 6 | |
| | ≡5 | 10 | 15 | 20 | 25 | 30 | 35 | 40 | 45 | 50 | 5TH. "BEAM" |
| 6TH. POSITION | 10 | 9 | 8 | 7 | 6 | 5 | 4 | 3 | 2 | 1 | |
| | ≡10 | 20 | 30 | 40 | 50 | 60 | 70 | 80 | 90 | 100 | 10TH. "BEAM" |
| 7TH. POSITION | 9 | 7 | 5 | 3 | 1 | 10 | 8 | 6 | 4 | 2 | |
| | ≡9 | 18 | 27 | 36 | 45 | 54 | 63 | 72 | 81 | 90 | 9TH. "BEAM" |
| 8TH. POSITION | 7 | 3 | 10 | 6 | 2 | 9 | 5 | 1 | 8 | 4 | |
| | ≡7 | 14 | 21 | 28 | 35 | 42 | 49 | 56 | 63 | 70 | 7TH. "BEAM" |
| 9TH. POSITION | 3 | 6 | 9 | 1 | 4 | 7 | 10 | 2 | 5 | 8 | |
| | ≡3 | 6 | 9 | 12 | 15 | 18 | 21 | 24 | 27 | 30 | 3RD. "BEAM" |
| 10TH. POSITION | 6 | 1 | 7 | 2 | 8 | 3 | 9 | 4 | 10 | 5 | |
| | ≡6 | 12 | 18 | 24 | 30 | 36 | 42 | 48 | 54 | 60 | 6TH. "BEAM" |

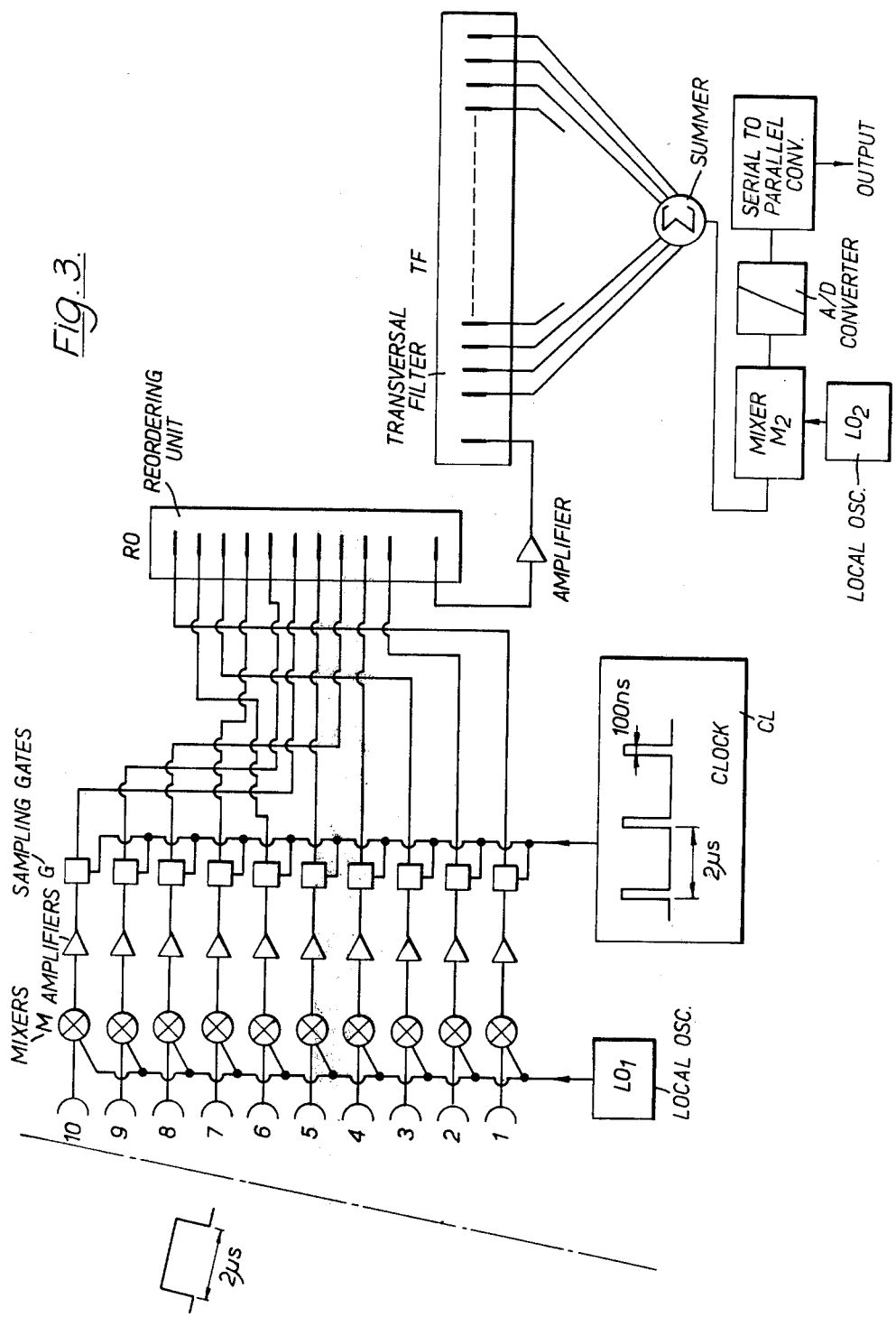

MULTIPLE BEAM RECEIVING ARRAY SIGNAL PROCESSOR

BACKGROUND OF THE INVENTION

The invention relates to a signal processor for a multiple beam receiving antenna array, such as may be used in radar applications.

In a pulsed surveillance Radar system designed to give, for example, elevation information, a transmitting antenna is pulsed with a radio frequency $f_c$, the duration and repetition rate of the pulses being determined by the normal constraints of range resolution and maximum unambiguous range for the system. The transmitting antenna is so designed that each transmitted pulse floods the whole sector to be covered. Reflection from a target anywhere in the sector is received by a linear array of antenna elements. Considering a given phase front for the received signals, it is clear that the signals received by the antenna elements will have an incremental phase difference, which is constant between successive antenna elements of the array. The amount of this phase difference is related in a known way to the angle of the target with respect to the axis (boresite) of the linear array. The received signals become outputs from the antenna elements and are then fed to a signal processor in which there is derived a signal which contains a component bearing a direct relationship to the angle of the target.

The concept of synthetic aperture radar is well known, and technical outgrowths of that concept have continued. Aperture Signal Processing is a term which involves the element by element processing of received signals in a planar phased array, for example. The technical literature, for example the text "Radar Handbook" by Merrill I. Skolnik (McGraw-Hill Book Co. 1970), provides a background in this regard.

The so-called Doppler Guidance systems (simulated Doppler by commutation of the elements of the transmitting array) provies a conceptual step in the development of Aperture Signal Processing Radar Systems. The patent literature is extensive in that connection, and the journal "Electrical Communication" published by International Telephone and Telegraph Corporation, Vol. 46, No. 4 (1971), pp 253-270 summarizes the technique in an article entitled "Doppler Scanning Guidance System". Although that system is basically a one way technique (for ground transmission and air borne signal processing for angle determination) it nevertheless contributed to the development of Aperture Signal Processing.

The manner in which the Aperture (array) Signal Processing art is advanced by the present invention will be understood as this description proceeds.

SUMMARY

According to the present invention, there is provided a signal processor for a multiple beam receiving antenna array in which the outputs from a linear array of (N-1) spaced antenna elements are separately mixed in (N-1) mixers with a common radio frequency offset from the radio frequency of the signals received by the array to produce intermediate frequency signals. The mixed signals are all sampled periodically and simultaneously, the processor including means for transferring the sampled signals serially to a phase weighted transversal filter in a sequence which is reordering of the linear sequence of aerial elements according to the prime number transform algorithm $p = g^i$ modulo N where i is the original sequence, p is the reordered sequence, and g is a so-called primitive root of a prime number N. This filter has a tapped delay line with the outputs of successive taps being individually phase weighted corresponding to the reordered sequence of the sampled signals, the outputs of the phase weighted taps being summed to effect a convolution of the input signal sequence and the phase weighting sequence.

The response of the filter contains the desired Fourier coefficients of the original array signals in scrambled order. These coefficients are effectively multiple beams of the array.

An embodiment of the invention will be described with reference to the accompanying drawing.

BRIEF DESCRIPTION OF THE DRAWINGS

FIGS. 2a, b, and c illustrate the flow of reordered sequence signals through a phase-weighted transversal filter, tabulated by input data position, in vector diagram form, and tabulated by reordered position, respectively.

FIG. 3 illustrates a signal processing arrangement for a linear array according to the invention.

DETAILED DESCRIPTION

Figure 1:
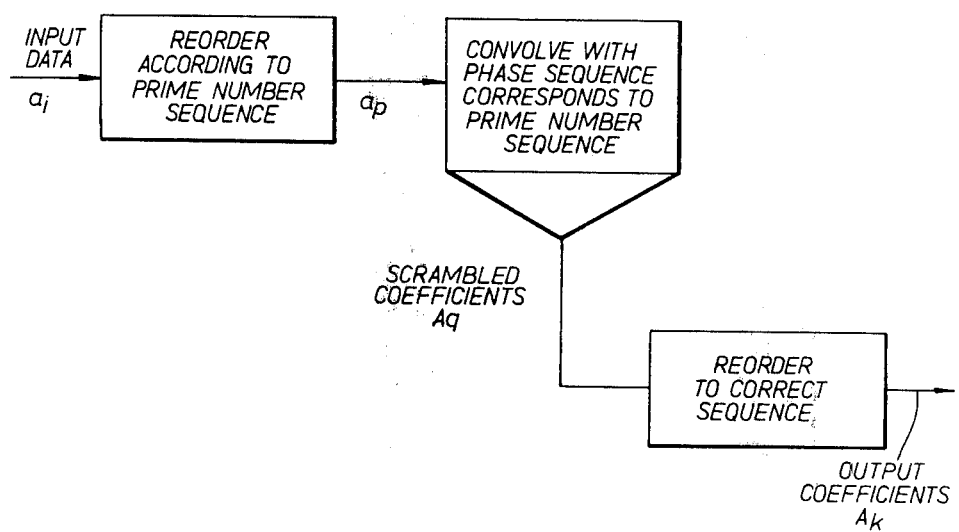
FIG. 1 illustrates the steps required in utilizing the prime number transform algorithm.

There are three basic stages in the prime number transform algorithm, as shown in FIG. 1.

a. Input data samples reordered accounting to a prime number sequence.

b. Reordered data is convolved with a phase sequence corresponding to the same prime sequence. The output from the convolver is the sequence of Discrete Fourier Transform (DFT) coefficients again in the order of the prime sequence).

c. The convolver outputs are reordered so that they appear in correct order 1, 2, 3, etc.

The sequences are required to be one-to-one mappings of the original sequence into the reordered sequence. Solutions exist if N (the number of data samples) is prime. The solution is of the form $$p = g^i \text{ modulo } N$$

Where
 i is the original sequence,
 p is the reordered sequence, and
 g is a so-called primitive root of N.

For example, with N=11, the lowest positive primitive root is given as g=2 and we can calculate the sequence p as follows:

| i | $g^i = 2^i$ | p = ($g^i$ modulo 11) |
|---|---|---|
| 1 | 2 | 2 |
| 2 | 4 | 4 |
| 3 | 8 | 8 |
| 4 | 16 | 16 − 11 = 5 |
| 5 | 32 | 32 − 22 = 10 |
| 6 | 64 | etc  9 |
| 7 | 128 | etc  7 |
| 8 | 256 | etc  3 |
| 9 | 512 | etc  6 |
| 10 | 1024 | etc  1 |

Notice that the sequence is of length N-1. The zeroth data sample (the "d-c term") is dealt with separately, at only a slight loss of elegance.

In broad terms, as indicated in the article "Discrete Fourier Transforms When the Number of Data Samples is Prime" by C. M. Rader, MIT Lincoln Labs, Proc IEEE June 1968 pp. 1107–8, the definition of a transformed sequence defined as the power of a primitive root enables the Discrete Fourier transform to be written as a convolution. We start with the definition of the DFT:

$$-A_K \text{ (the } k\text{th Fourier coefficient)} = \sum_{i=0}^{N-1} a_i \exp(-j2\pi ik/N)$$

where $a_i$ is the input data sequence.

As already mentioned, the d-c coefficient is dealt with separately by direct summation, $$A_O = \sum_{i=0}^{i=N-1} a_i$$

Also, we notice that $a_o$ is not modified before being summed, and the DFT for k from 1 to N-1 is therefore rewritten as $$(A_R - a_o) = \sum_{i=1}^{i=N-1} a_i \exp(-j2\pi ik/N)$$

The order of the terms is changed in the summation by using the transformed sequence, i.e., i is replaced by p (=gi modulo N) and k by q (=gk modulo N). The DFT can now be written as $$(A_q - a_o) = \sum_{i=1}^{i=N-1} a_p \exp\left[-2j\frac{\pi}{N}pq\right] =$$

$$\sum_{i=1}^{i=N-1} a_p \exp\left(-2j\frac{\pi}{N}g^{(i+k)}\right)$$

which is the convolution of the reordered input samples with a phase sequence of $2\pi/N$ p radians. It is the transformerion of the product (ik) in the original DFT expression into a sum (i+k) in the above equation that is the key to understanding the potential advantages of the method.

FIG. 2 shows the flow of the reordered N-1 sequence through a transversal filter having the requisite impulse response, for N=11. It can be seen that in each position the summed output of the filter (which is the convolution operation) is indeed of the form required to obtain the various fourier coefficients, i.e. the data samples are phase weighted in regular increments in the correct (original) order. The output is scrambled in time and a reordering operation is necessary, if the coefficients are required in the correct order.

If the zero order coefficient is required, and if the contribution of the zeroth data sample to the other coefficients is to be included, then additional summing is necessary. There may be applications, however, when neither is required.

Considering now the application of the foregoing in a signal processor for a multiple beam receiving antenna array, attention is directed to FIG. 3. The array is a linear arrangement of equally spaced antenna elements 1–10 receiving 2 µs radar pulses. The outputs from these elements are fed to separate mixers M where they are mixed with the output of a local oscillator $LO_1$ the radio frequency of which results in a first IF (say around 100 MHz) in each channel matched to the radar pulse length (bandwidth ½ MHz).

The mixed signals are then separately amplified and fed to sampling gates G where they are simultaneously sampled under the control of a local clock source CL, the duration, timing and repetition rate of the clock pulses being related to those of the transmitted pulses from a transmitting antenna (not shown) e.g. 100 ns pulses at 2 µs intervals. The samples pulses are then fed to a reordering unit RO. Since the samples are initially presented to RO in parallel and since convolution is, as will be explained below, a serial process, RO must also incorporate a parallel-to-serial capability. The use of a surface acoustic wave (SAW) delay line device provides a convenient method of combining the reordering with the parallel-to-serial conversion. Reordering is accomplished quite simply by the arrangement of wiring connections between the gates G and the tap inputs to RO. The antenna signals are thus reordered into the prime sequence 2,4,8,5,10,9,7,3,6,1. The reordered signals are transferred from the output tap of RO to the input tap of a second SAW delay line which forms part of a transversal filter TF. The output taps of the second delay line are spaced at predetermined intervals so as to give different phase weighting to the outputs with respect to the input, these phase weightings corresponding to the reordering sequence of RO. The total length of the second delay line is 2 µs and the delay line has in fact two successive sequences of phase weighted taps, as indicated in FIG. 2c. This allows the whole of the reordered sequence to be entered into the filter before a significant output is obtained. During the first 1 µs of serial transfer, the output of TF will be meaningless noise. During the second 1 µs of propagation through the filter, the whole of the reordered sequence is available in the filter for convolution and 10 output coefficients of the 11 point DFT appear in prime number sequence. These coefficients are then mixed in $M_2$ with a second local oscillator signal $LO_2$ to produce a second intermediate frequency signal which is then fed to a fast analog-to-digital converter A/D before a final serial-to-parallel conversion and reordering back to the original linear sequence.

The method described above does not form the complete 11 point DFT. It drops one of the data samples and drops one of the coefficients. One impact of this is that the coefficient spacings no longer match the square aperture beamwidth, and thus the coefficients are no longer essentially independent. In practice, most antenna beams are amplitude tapered in some way with the result that the coefficients are already partially coupled. In most instances, this should not present a problem. The second effect is that the boresight beam is not formed. This will be unacceptable for azimuthal coverage and reinstatement of the 11th sample would be required. For elevation coverage, however, the problem can be avoided by arranging the boresight to be below the horizon, either mechanically or by fixed phasing from the antenna.

Mention has been made of the suitability of SAW techniques for signal processing in the manner described above. SAW delay lines are suitable for intertap spacings of 100 ns and the required phase weights in the transversal filter can be provided by displacements of the taps around a mean spacing of 100 ns with accuracies of better than 5 degrees at an IF of 100 MHz, the "time slippage" error being relatively small with such an arrangement. However, if this is not the case, the use of paired "in-phase" and "quadrature" taps can be used to provide the phase weighting without any associated problem of time slippage.

What is claimed is:

1. A signal processor for a multiple element radar receiving antenna array of N-1 spaced antenna elements, comprising:

N-1 mixers each discretely responsive to the received signal on a corresponding one of said antenna elements, said mixers operating against a local oscillator frequency off-set by a predetermined amount from the radio frequency of said received signals to generate N-1 intermediate frequency signals;

means for sampling said N-1 intermediate frequency signals periodically and simultaneously to provide N-1 sample signals:

a phase weighted transversal filter and means for transferring said sample signals serially to said filter in a sequence which is a reordering of the linear phase sequence of said antenna elements according to the prime number transform algorithm $p = g^i$ modulo N, where i is the original sequence, p is the reordered sequence, and g is the primitive root of a prime number N;

means within said transversal filter comprising a tapped delay line with the outputs of successive taps thereof being individually phase weighted corresponding to the reordered sequence of said sampled signals;

and means for summing the phase weighted taps of said delay line to effect a convolution of the input signal sequence and the phase weighting sequence.

2. A processor according to claim 1 in which said means for transferring said sampled signals in said reordered sequence comprises a surface acoustic wave delay line having (N-1) equispaced input taps, means for selectively connecting said linear array elements to said taps to form said reordered sequence, and means for deriving said reordered signals serially.

3. A processor according to claim 1 or claim 2 in which said phase weighted filter comprises a surface wave delay line having an input and at least 2(N-1) output taps spaced at predetermined distances for said input to effect phase weighting of the serial signals received from said transferring means.

4. A processor according to claims 1 or 2 further including means for summing the outputs of said filter and for mixing the summed output with a second local oscillator frequency to produce second intermediate frequency signals.

5. A processor according to claim 4 further including means for series-to-parallel conversion of said summed output.

* * * * *